US006606211B1

(12) United States Patent
Lim et al.

(10) Patent No.: US 6,606,211 B1
(45) Date of Patent: Aug. 12, 2003

(54) METHOD AND APPARATUS FOR DETECTING MEDIA DEFECTS IN A DISC DRIVE

(75) Inventors: Tuang Liang Bernard Lim, Singapore (SG); Myint Ngwe, Singapore (SG); Hwee Peng Teo, Singapore (SG); Fong Kheon Chong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/556,884

(22) Filed: Apr. 19, 2000

Related U.S. Application Data

(60) Provisional application No. 60/130,313, filed on Apr. 21, 1999.

(51) Int. Cl.[7] .................................................. G11B 5/09
(52) U.S. Cl. .......................................... 360/53; 360/31
(58) Field of Search .............................. 360/53, 31, 25

(56) References Cited

U.S. PATENT DOCUMENTS

| 4,549,295 | A |   | 10/1985 | Purvis |
| 5,031,054 | A |   | 7/1991  | Lewis |
| 5,563,746 | A |   | 10/1996 | Bliss |
| 6,151,180 | A | * | 11/2000 | Bang .......................... 360/25 |
| 6,175,459 | B1 | * | 1/2001 | Tomita ........................ 360/25 |

\* cited by examiner

*Primary Examiner*—David Hudspeth
*Assistant Examiner*—Varsha A. Kapadia
(74) *Attorney, Agent, or Firm*—Mitchell K. McCarthy

(57) ABSTRACT

Apparatus for detecting defect in a recordable medium such as a disc drive is disclosed. The apparatus includes a recording system which write and read test data on the medium. The apparatus also includes a first comparator for comparing the read data to a first threshold. A first and a second counter, operably connected to the first comparator, are incremented when the read data exceeds the first threshold. When the first counter obtains a first count value, a first defect signal is produced. Data domains associated with the recordable medium are marked as bad in response to the first defect signal. When the second counter obtains a second count value, a second defect signal is produced and data sectors associated with the recordable medium are marked as bad in response to the second defect signal. A method for detecting defects in a recordable medium is also disclosed.

16 Claims, 6 Drawing Sheets

METHOD AND APPARATUS FOR DETECTING MEDIA DEFECTS IN A DISC DRIVE

This patent application claims priority from U.S. Provisional Application No. 60/130,313 filed Apr. 21, 1999.

FIELD OF THE INVENTION

The present invention relates generally to a disc drive. More particularly, the present invention relates to a method and apparatus for detecting media defects in the disc drive.

BACKGROUND OF THE INVENTION

Before a disc drive leaves the factory it is scanned to determine the location of media defects that will give rise to problems in reading back data. Defect scanning is a time consuming process (upwards of 3 hours depending on the severity of the defects) which is exacerbated as the storage capacity of disc drives increases. Controllers associated with disc drives incorporate ECC (Error Correction Code) to reduce the incidence of errors when reading back data. A normal write, also known as sector write is commonly used to write data in a sector. Prior art defect scanning procedures assume a low level of error correction (say T1) to minimize risks of missing defects. This means that improved error correction (T2 to T5) capabilities available in modern disc drives are not being fully utilized.

One prior art defect scan method involves writing a detect pattern. This is achieved by using a wedge write where writing is done from servo sector to servo sector. A wedge write normally contains three to four sectors depending on the way the media is zoned. A commonly used detect pattern is a 2T preamble synch pattern which follows from PRML (Partial Response Maximum Likelihood), a 5 level (+2, +1, 0, −1, −2) detect pattern. The synch pattern is read back whilst comparing it with a threshold value which should not be exceeded. Whenever the threshold value is exceeded a read error is flagged and the location which gives rise to the error is marked as a defect or a "bad" location. However, this process can give rise to an excessive number of defects, which reduces the capacity of the drive unnecessarily. To improve drive yield and speed up the defect scanning process it is desirable to avoid labelling as defects, locations which will give rise to errors that may be recovered by error correction.

SUMMARY OF THE INVENTION

The present invention provides a method and apparatus for detecting media defects in a disc drive which addresses the above-mentioned problem.

The method of the present invention introduces a threshold on the number of location defects that may be tolerated before labelling the locations as bad. This may avoid labelling as bad, locations which will give rise to errors that may be recovered by error correction. It may also reduce substantially the time required for performing defect scanning. In one form the consecutive defects may be accumulated in a Consecutive Defect Counter (CDC). When the number of consecutive defects reaches a predetermined threshold value (say 5 bits long) the output of the CDC counter may flag a defect. The defect bit length may be controlled by an appropriate selection of the predetermined threshold value. In a typical implementation the CDC defect may be flagged as a set pattern (say F0 Hex) on an NRZ (Non Return to Zero) 8 bit data output line associated with the CDC counter.

The number of total defects may be accumulated in a Total Defect Counter (TDC). When the number of total defects reaches a predetermined threshold value (say 30 single bit defects, irrespective of the length of each bit), the output of the TDC counter may flag a defect. In a typical implementation the TDC defect may be flagged as a set pattern (say F1 Hex) on the NRZ 8 bit data output line associated with the TDC counter. One reason for having the CDC and TDC in this method is to enhance the limitations of the existing methods for detecting media defects. The manner of mapping the defect detected by the CDC and the TDC differ.

In prior art data is written either using sector write or wedge write. In the present invention, both sector and wedge write is used. If it is a CDC defect, that sector will be flagged as a defect. If it is a TDC defect, the entire wedge will be flagged as defective.

According to one aspect of the present invention there is provided a method for detecting defects in a recordable medium such as a disc drive. The method has a step for writing and reading test data on the medium. The method also has a step for comparing the read data to a first threshold. In another step of the method a first counter is incremented each time the first threshold is exceeded. The further step for providing a first defect signal when the counter reaches a predetecting count value is also part of this method.

The recordable medium may include a plurality of data domains for recording data. The method of the present invention may include the step of marking as bad, one or more of the data domains in response to the first defect signal.

The method of the present invention may include incrementing a second counter each time the first threshold is exceeded and producing a second defect signal when the second counter obtains a second count value. The data domains may be organized into data sectors. The method may include marking as bad, one or more of the data sectors in response to the second defect signal.

The method of the present invention may be implemented as a computer-readable program storage device which tangibly embodies a program of instructions executable by a computer system to perform the method.

According to another aspect of the present invention there is provided apparatus for detecting defects in a recordable medium such as a disc drive. The apparatus has a recording system for writing and reading test data on the medium. The apparatus also has a first comparator for comparing the read data to a first threshold. Another feature in the apparatus is a first counter operably connected to the first comparator, the first counter being incremented when the read data exceeds the first threshold. A single generator which produces a first defect signal when the first counter obtains a first count value also forms part of the apparatus.

These and various other features as well as advantages which characterize the present invention will be apparent upon reading of the following detailed description and review of the associated drawings.

DETAILED DESCRIPTION

Figure 1:
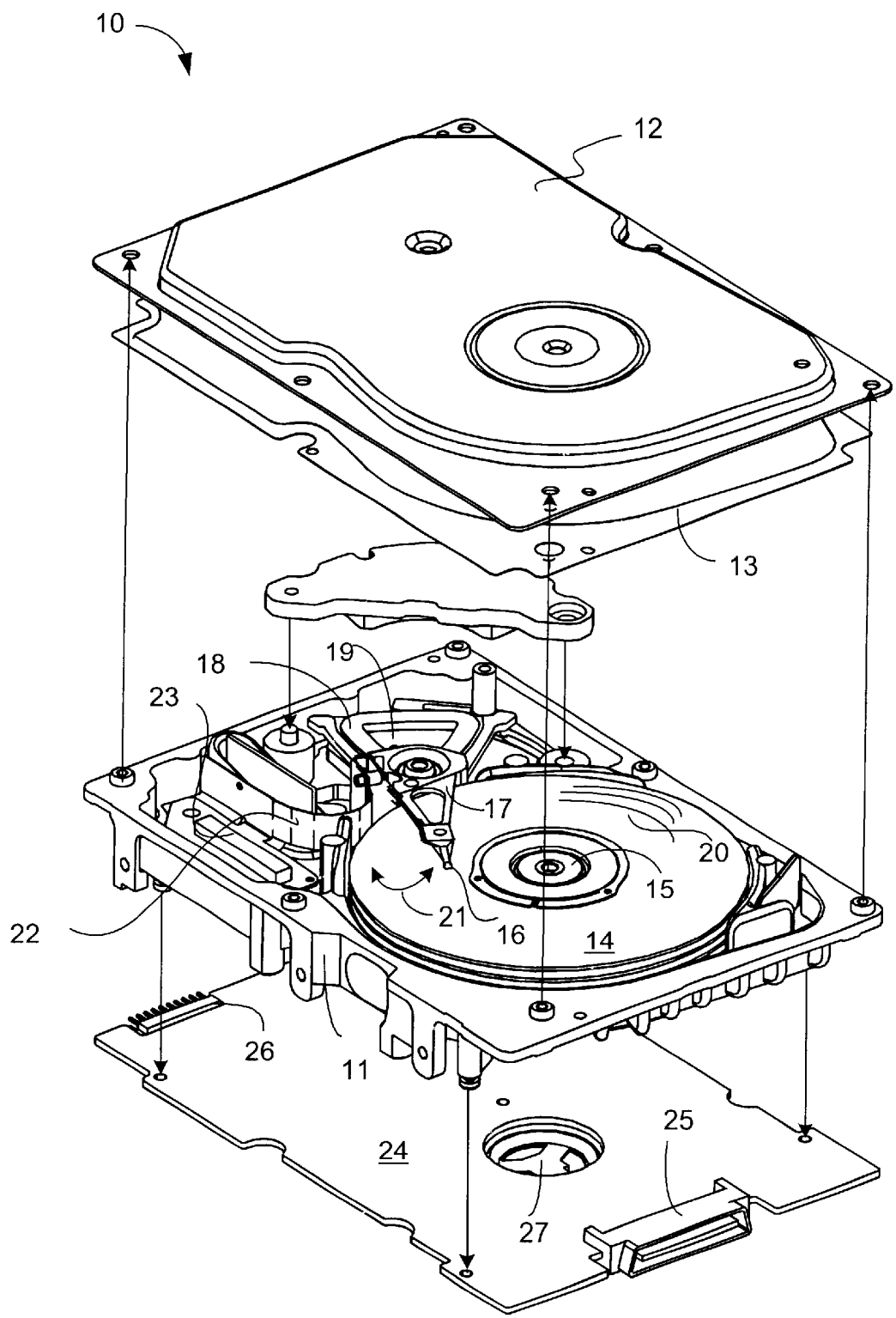
FIG. 1 shows an exploded view of a disc drive.

FIG. 1 shows a disc drive in exploded view. Briefly, the disc drive 10 includes a housing base 11 and a top cover 12, which engage a gasket 13 to form a sealed housing that maintains a clean environment therein. A plurality of disks 14 is mounted for rotation on a spindle motor hub 15. A plurality of transducer heads 16 is mounted to an actuator body 17. The actuator body 17 is adapted for pivotal motion under control of a voice coil motor (VCM) including a voice coil 18 and magnets 19 to controllably move a head 16 to a desired track 20 along an arcuate path 21. Signals used to control the VCM and the heads 16 pass via a flex circuit 22 and a connector 23 to and from electronic circuitry on controller board 24. The controller board 24 includes a fibre channel interface 25, a serial port connector 26 and a spindle connector 27.

Figure 2:
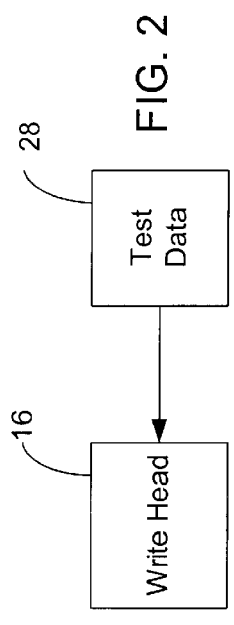
FIG. 2 shows components of an apparatus in one embodiment of the present invention where test data is written by the write head.
Figure 4:
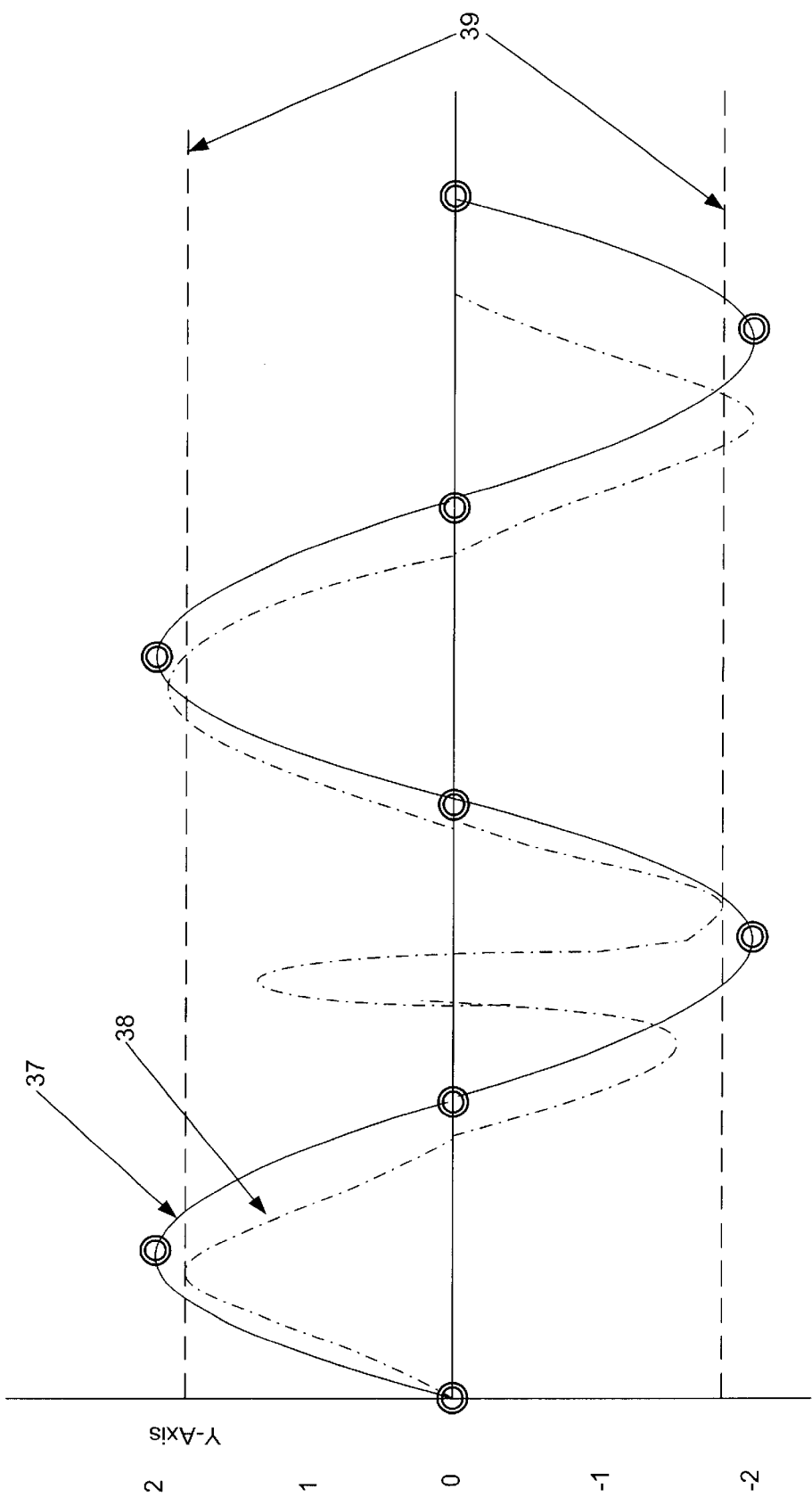
FIG. 4 shows one form of test data signal, which is written and read.

FIG. 2 shows a read/write head 16 operably connected to a source 28 of test data. The test data may comprise a 2T-preamble synch pattern 37 as shown in FIG. 4. The 2T synch pattern 37 follows from PRML (Partial Response Maximum Likelihood) and is a standard detect pattern commonly used in the industry. PRML is a five (5) level (+2, +1, 0, −1, −2) detect pattern. A readback signal 38 in comparison with the standard detect pattern 37 is also shown in FIG. 4.

Figure 3:
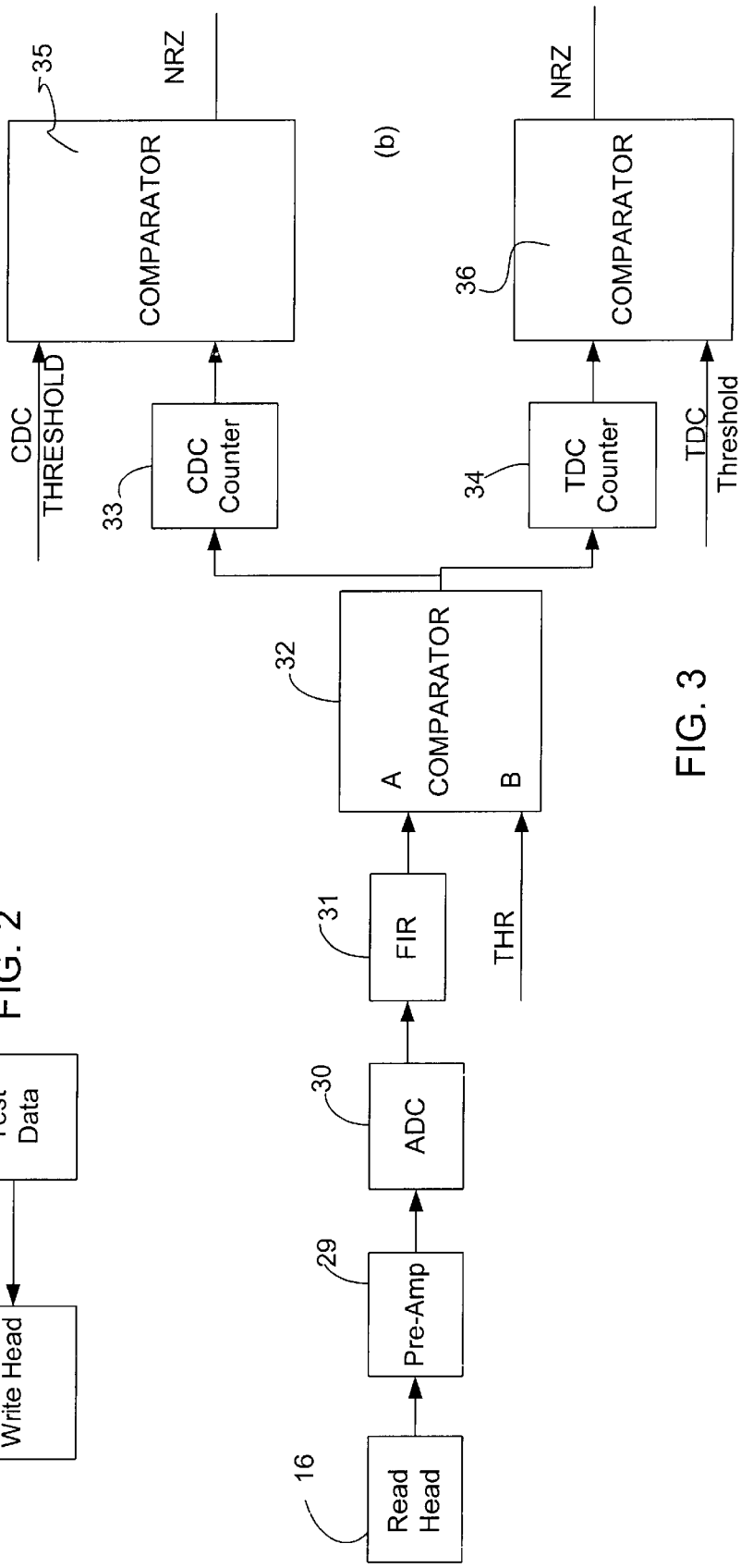
FIG. 3 shows components of an apparatus in an embodiment of the present invention where media defects are detected.

FIG. 3 shows apparatus including a preamplifier 29 operably connected to read/write head 16: The analog output from preamplifier 29 passes to analog to digital (ADC) converter 30 where it is converted to a digital signal.

The digital signal from ADC converter 30 passes to finite impulse response (FIR) filter 31 which conducts a parity check. FIR filter 31 also corrects the phase of the signal to be as close as possible to the 2T preamble 37.

The filtered signal passes to input A of comparator 32. Input B of comparator 32 has applied to it a threshold signal THR 39 which is a predetermined percentage of the 2T preamble 37. In one form, the THR signal may be set at approximately 90% of the level of the 2T preamble 37 as illustrated in FIG. 4.

Comparator 32 flags a defect at its output whenever the signal at input A is greater than the signal at input B. The defect signals are accumulated in CDC counter 33 and TDC counter 34. The count value of CDC counter 33 is applied to comparator 35 where it is compared to a CDC threshold value. When the count value of CDC counter 33 exceeds the CDC threshold (say 5) the output of comparator 35 flags a CDC defect. This may be represented via an 8 bit NRZ output line as a CDC defect pattern NRZ=FO (Hex). CDC counter 33 is then reset to accumulate the next string of defect signals.

The count value of TDC counter 34 is applied to comparator 36 where it is compared to a TDC threshold value. When the count value of DC counter 34 exceeds the TDC threshold (say 30) the output of comparator 36 flags a TDC defect. This may be represented via an 8 bit NRZ output line as a TDC defect pattern NRZ=F1 (Hex). TDC counter 34 is then reset to accumulate the next string of defect signals.

When the NRZ output registers a CDC or TDC defect pattern (F0 or F1) the data domain or sector of the disc drive which gave rise to the defect pattern is marked as bad and made invisible to the user. For example if there are n data sectors on a disk surface and a defect is registered on one sector, then that sector will be marked leaving only n−1 data sectors to store information. This lowers the capacity of the disc drive by a factor of 1/n.

Figure 5:
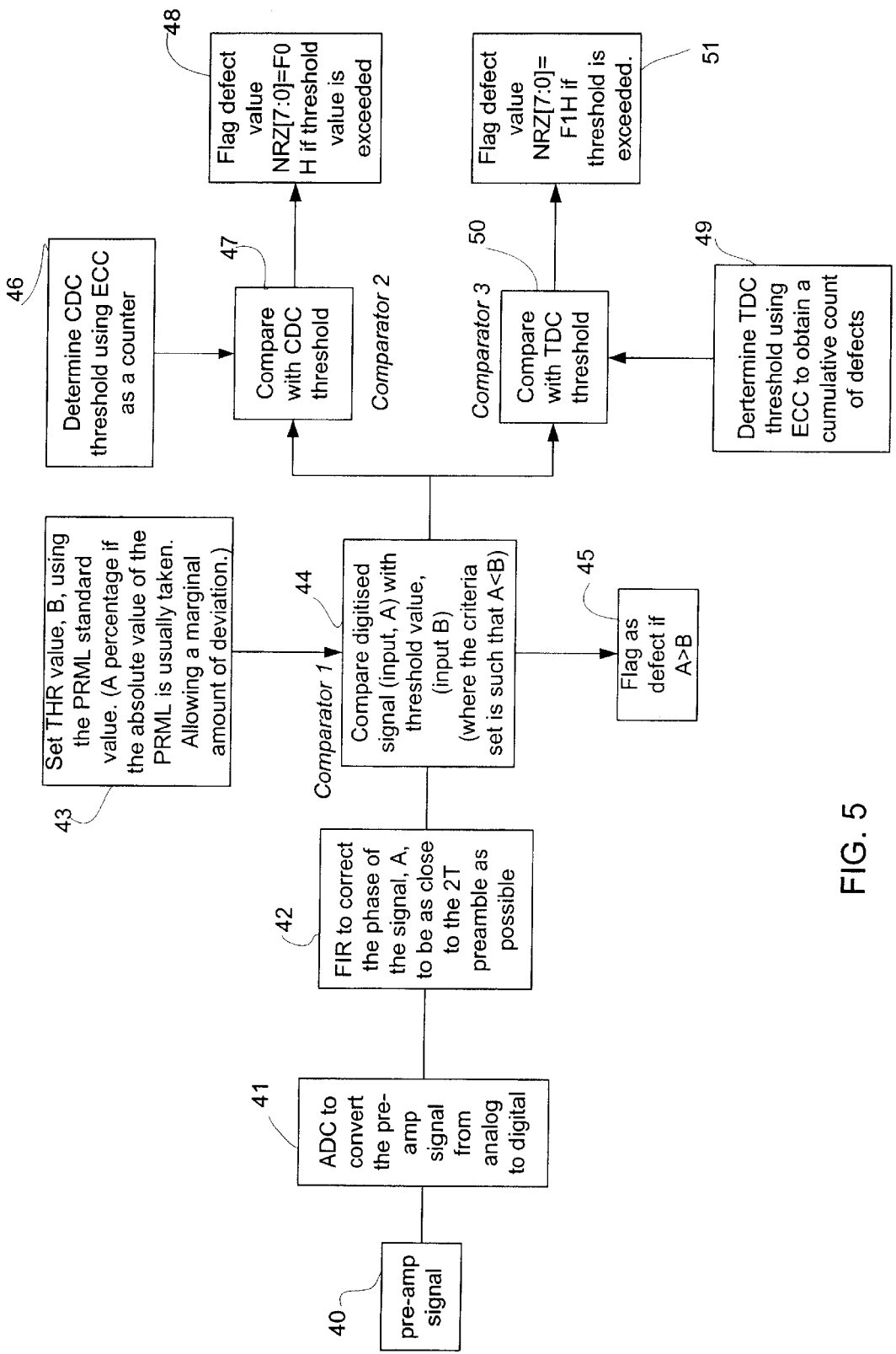
FIG. 5 shows a flow diagram exemplifying a method for detecting media defects in a disc drive.

FIG. 5 shows a flow diagram of a method for detecting media defects utilizing the apparatus of FIG. 2 and FIG. 3. In FIG. 5 the analog preamp signal 40, which is the signal from, read head 16 after amplification is converted 41 to a digital signal. The phase of the digital signal is corrected 42 to be as close as possible to the 2T preamble. A threshold value (THR) is set 43 as a percentage of PRML standard. The digitized and phase corrected signal is applied to input A of a first comparator where it is compared 44 to the threshold value applied to input B of the first comparator.

A defect is flagged 45 if input A of the first comparator is greater than input B. If input A is less than input B, input A will be subjected to two further comparison in a second comparator and a third comparator where comparison in both comparator takes place simultaneously.

Figure 6:
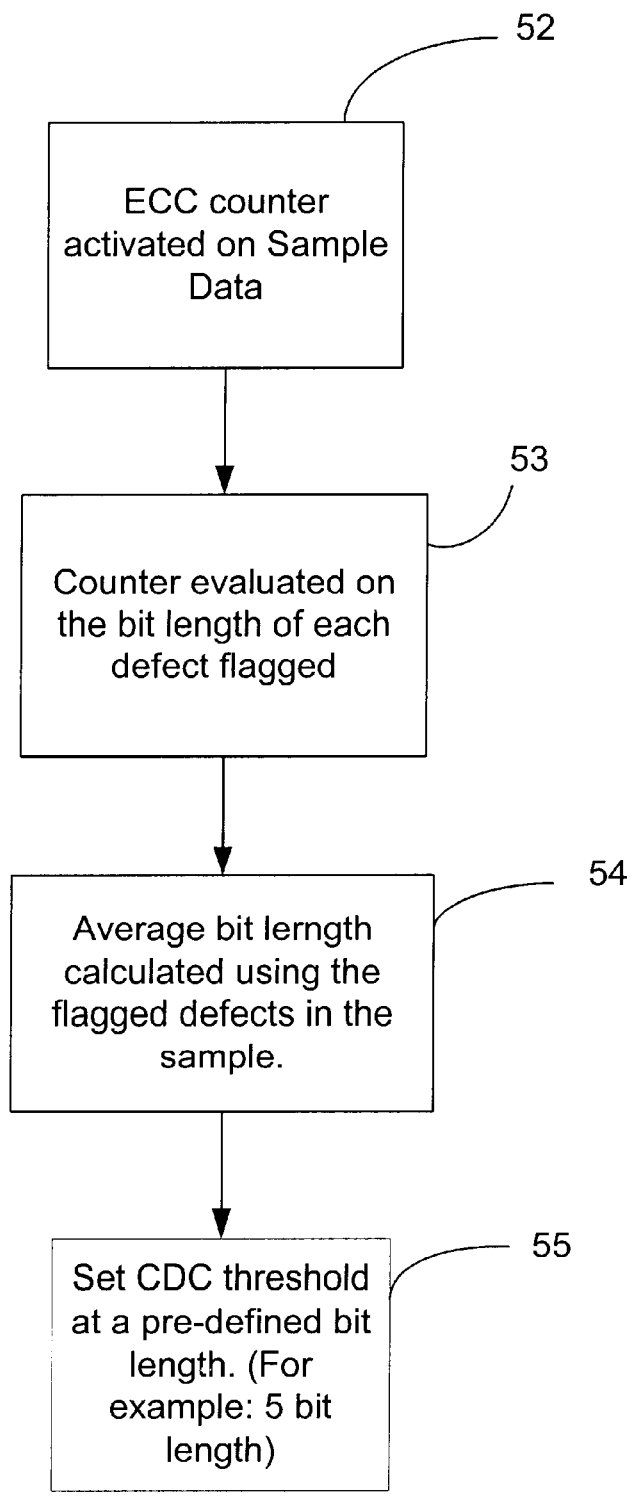
FIG. 6 shows a flow diagram exemplifying a method of setting a CDC threshold value.
Figure 7:
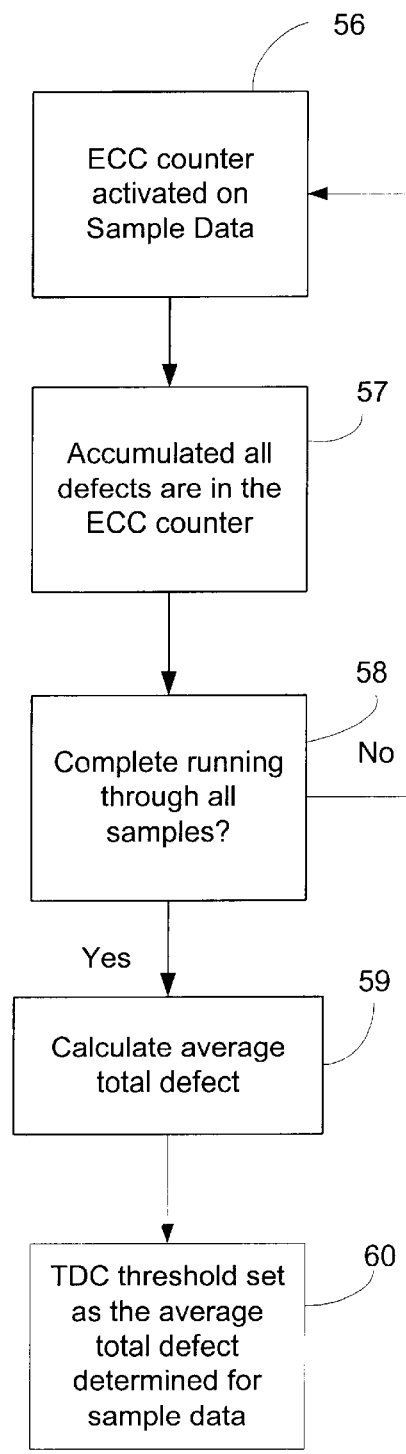
FIG. 7 shows a flow diagram exemplifying a method of setting a TDC threshold value.

In the second comparator 47, the input A is compared with a CDC threshold. The CDC threshold is set using an ECC (Error Correction Code) counter, which is applied to sample data. FIG. 6 shows an example of how the CDC threshold is established. The ECC counter is activated on a sample data 52 to determine the defects that cannot be corrected 53. The average bit length of the accumulated defects is determined 54. The CDC threshold is set as the average bit length 55. When the CDC threshold is exceeded a defect value is flagged 48 by the CDC counter. For example, if the CDC threshold is set at bit length of 5, any defect of bit length greater than (5) will be flagged. The defects are also accumulated 49 in a TDC counter and compared 50 with a TDC threshold in a third comparator. The DC threshold is set and the TDC counter is activated according to the flow diagram shown in FIG. 7. In FIG. 7 the ECC counter is activated on sample data and all defects in the sample are accumulated 57. This is repeated for a few sample data 58. The average total defect based on the sample data is calculated 59. This average total defect value is set as the TDC threshold 60. For example, the TDC threshold is set at not more than 30 single bits in total where the length of the each bit is not considered. When the TDC counter accumulates a count for any one sector where the count exceeds this threshold value, that particular sector will be flagged 51 as defective.

In summary, one aspect of the present invention there is provided a method for detecting defects in a recordable medium such as a disc drive, with steps for writing and reading test data on the medium is provided. The test data in the method includes a 2T-preamble synch pattern 37. The method also compares the read data to a first threshold 44 which is a predetermined percentage of a signal 43 associated with the test data. Another step 46 in the method increments a first counter each time the first threshold is exceeded. A step 47 for producing a first defect signal, when the first counter obtains a first count value 46, is also provided in the method. The first count value 55 may be set at five (5 bit length). In the recordable medium with plural data domains, the method also has a step to 48 mark one or more of the data domains as bad in response to the first defect signal. A further step 50 of incrementing a second counter each time the first threshold is exceeded is provided in the same method. There is also a step to produce a second defect signal 51 when the second counter obtains a second count value 49. The second count value 60 may be set at thirty (30 single bits). Where the data domains are organized into data sectors, a step 51 is provided to mark one or more of the data sectors as bad in response to the second defect signal.

In another aspect of the present invention an apparatus for detecting defects in a recordable medium such as a disc drive is provided. The apparatus has a recording system 16 to write and read test data on the medium. The test data in the apparatus includes a 2T-preamble synch pattern 37. The apparatus has a first comparator 32 for comparing the read data to a first threshold, a predetermined percentage of a signal associated with the test data. Another element in the apparatus is a first counter 33 operably connected to the first comparator, where the first counter is incremented when the read data exceeds the first threshold. A signal generator 35 which produces a first defect signal when the first counter obtains a first count value forms part of the apparatus. The first count value is set at five (5). There are plural data domain in the medium of the apparatus where the apparatus has a mechanism for marking one or more of the data domains as bad in response to the first defect signal. The data domains are organized into data sectors and a mechanism is used to mark one or more of the data sectors as bad in response to the second defect signal. A second counter 34 operably connected to the first comparator forms another part of the apparatus. The second counter is incremented when the read data exceeds the first threshold. When the second counter 34 obtains a second count value, set at thirty (30), the signal generator 36 produces a second defect signal with a mechanism.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the preferred embodiment described herein is directed to a disc drive, it will be appreciated by those skilled in the art that the teachings of the present invention can be applied to other storage systems which incorporate recordable media, without departing from the scope and spirit of the present invention.

What is claimed is:

1. A method for detecting defects in a recordable medium having data stored therein, comprising:
   reading a data signal characterizing the data;
   comparing the data signal to a preselected threshold signal value to indicate an occurrence of a data read error;
   comparing a number of consecutive data read errors to a first preselected count;
   comparing the total number of data read errors to a second preselected count;
   marking a corresponding portion of the medium as defective only if one of the number of consecutive data read errors and the total number of data read errors equals the respective preselected counts.

2. The method of claim 1 wherein the marking step is performed to the exclusion of any data error correction steps.

3. The method of claim 1 wherein the data medium comprises a plurality of data domains, wherein the marking step affects one or more of the domains.

4. The method of claim 3 wherein the marking step affects a data sector if the consecutive data read errors equals the first preselected count.

5. The method of claim 3 wherein the marking step affects a data wedge if the total number of data read errors equals the second preselected count.

6. The method of claim 3 further comprising after the marking step:
   resetting the counters; and
   repeating the reading, comparing and marking steps.

7. An apparatus for marking defective stored data in a data storage medium, comprising:
   a data transfer member operably disposable in a data transfer relationship with the medium for reading a data signal characterizing the stored data;
   a first comparator member comparing the data signal to a preselected threshold to indicate an occurrence of a data read error;
   a second comparator member responsive to the first comparator member, comparing a number of consecutive data read errors to a first preselected count;
   a third comparator member responsive to the first comparator member, comparing the total number of data read errors to a second preselected count;
   a marking member marking a corresponding portion of the medium as defective only if one of the number of consecutive data read errors and the total number of data read errors equals the respective preselected counts.

8. The apparatus of claim 7 wherein the marking member marks the corresponding portion of the medium to the exclusion of any data error correction steps.

9. The apparatus of claim 7 wherein the medium comprises a plurality of data domains, wherein the marking member marks one or more of the domains.

10. The apparatus of claim 9 wherein the marking member marks a data sector if the consecutive data read errors equals the first preselected count.

11. The apparatus of claim 9 wherein the marking member marks a data wedge if the total number of data read errors equals the second preselected count.

12. The apparatus of claim 7 wherein the counters are resettable after the marking member marks the medium.

13. A disc drive, comprising:
   a data storage medium and a data transfer member in an operable data reading and writing relationship;
   means for marking a portion of the medium, preventing the subsequent storage of data therein based on the detection of the magnitude and quantity of data read errors without error correction attempts, the means for marking is characterized by: a first comparator member comparing the data signal to a preselected threshold to indicate an occurrence of a data read error; a second comparator member responsive to the first comparator member, comparing a number of consecutive data read errors to a first preselected count; a third comparator member responsive to the first comparator member, comparing the total number of data read errors to a second preselected counts; a marking member marking a corresponding portion of the medium as defective only if one of the number of consecutive data read errors and the total number of data read errors equals the respective preselected counts.

14. The disc drive of claim 13 wherein the medium comprises a plurality of data domains, and wherein the means for marking is characterized as affecting one or more of the domains.

15. The disc drive of claim 14 wherein the means for marking is characterized as affecting a data sector if the consecutive data read errors equals the first preselected count.

16. The disc drive of claim 14 wherein the means for marking is characterized as affecting a data wedge if the total data read errors equals the second preselected count.

* * * * *